United States Patent [19]

DeMoss et al.

[11] Patent Number: 4,823,215

[45] Date of Patent: Apr. 18, 1989

[54] FLEXIBLE DISK PACK MODULE WITH IMPROVED DELTA-PAK STIFFENERS

[75] Inventors: Dean DeMoss, Camarillo; Harvey J. Richardson, Sepulveda; Tom Narasaki, Camarillo, all of Calif.

[73] Assignee: Unisys Corp., Detroit, Mich.

[21] Appl. No.: 238,741

[22] Filed: Feb. 27, 1981

[51] Int. Cl.$^4$ .................... G11B 25/04; G11B 23/02
[52] U.S. Cl. ........................... 360/98.02; 360/98.01
[58] Field of Search ................... 360/97–99, 360/133, 135, 98.01, 98.02; 358/128

[56] References Cited

U.S. PATENT DOCUMENTS

| | | | |
|---|---|---|---|
| 4,167,029 | 9/1979 | Ragle et al. | 360/99 |
| 4,208,683 | 6/1980 | Kleczkowski | 360/99 |
| 4,327,386 | 4/1982 | DeMoss et al. | 360/99 |
| 4,345,285 | 8/1982 | DeMoss et al. | 360/99 |
| 4,514,778 | 4/1985 | Ragle et al. | 360/133 |

OTHER PUBLICATIONS

IBM, TDB, G. D. Herring et al., Adjustable Flexible Disk Pack Assembly, vol. 17, No. 6, Nov. 1974, pp. 1710–1711.
IBM, TDB, S. P. Kleczkowski et al., Disk–Cushion–Providing End Plates, vol. 21, No. 5, Oct. 1978, p. 1790.
IBM, TDB, J. H. Koestner et al., Multiple Access Flexible Disk Storage Apparatus, vol. 18, No. 9, Feb. 1976, pp. 2773–2774.
IBM, TDB, D. J. Wanek, Controlled Slope Flexible Disk Pack, vol. 19, No. 12, May 1977, pp. 4717–4718.

Primary Examiner—Alan Faber
Assistant Examiner—Steven R. Garland
Attorney, Agent, or Firm—John J. McCormack

[57] ABSTRACT

A flexible disk pack having a pair of floppy end plates. The end plates are adapted to assume a Delta or tapered shape when they are rotated with the record pack. Each of the end plates is formed of at least two stacks of contiguous flexible disks separated by wedge spacers. The thickness and mass of the outer stack of each end plate is determined by the stiffness desired while the thickness and mass of the inner stack is selected to cause it to bend smoothly toward the outer stack allowing for pneumatic stability during partitioning.

1 Claim, 10 Drawing Sheets

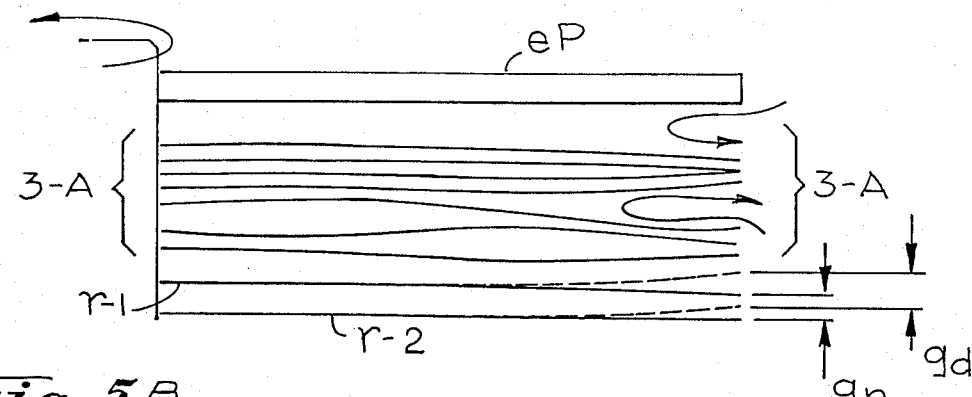
Fig. 5B
Fig. 5C
Fig. 5D
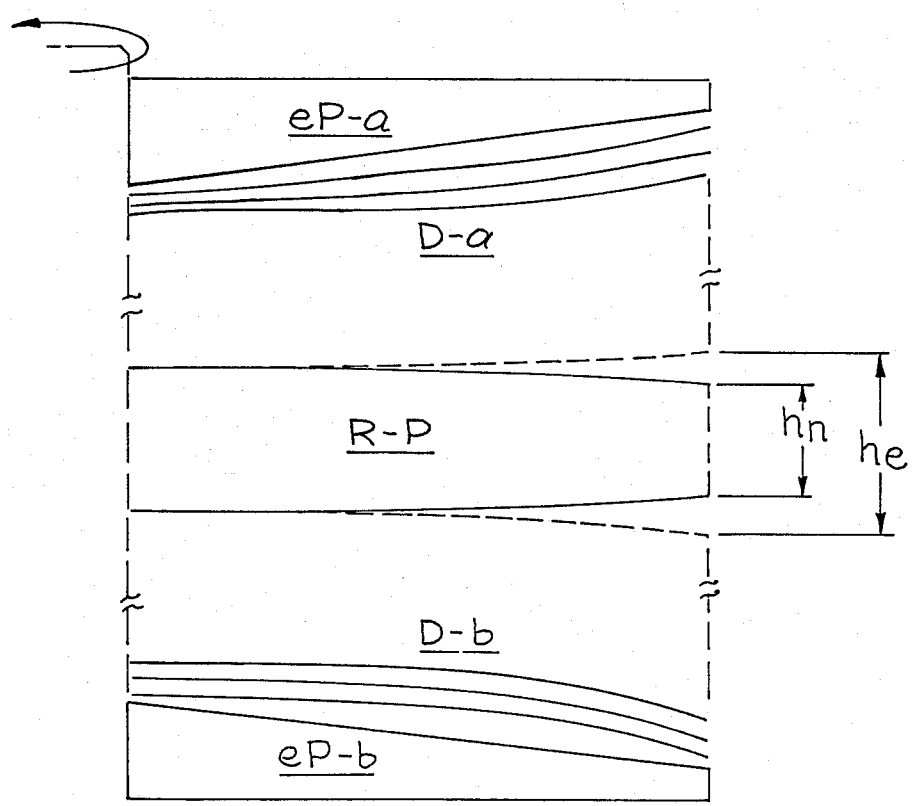
Fig. 5E

FLEXIBLE DISK PACK MODULE WITH IMPROVED DELTA-PAK STIFFENERS

INTRODUCTION, BACKGROUND

This invention relates to flexible recording disk packs and particularly to improved techniques for developing a stacked array of flexible disks with enhanced isolation means at both ends.

In a preferred mode, a disk pack is flanked top and bottom by respective "dummy packs", each, in turn, flanked by a respective tapered flexible end-plate, the end-plates being formed simply from stacks of contiguous flexible disks, separated at their hub by a "spacer-wedge".

Workers in the subject art have constructed record storage apparatus using coaxial stacks of flexible record disks, as indicated, for instance in U.S. Pat. Nos. 3,838,462; 3,838,461; 3,969,767 and 4,167,029.

Workers are aware that the use of floppy disk packs dictate minimal cost for pack elements and associated equipment, such as partitioning means. The invention is directed toward this end, and toward accommodating a simple, non-mechanical, pneumatic, end-wise partitioning of floppy disk packs; as well as toward providing disk packs with improved flexible end-plates, better adapted to meet the usual problems and objectives. Such disk packs and associated end-wise partitioning means may be gleaned from U.S. Pat. No. 4,167,029 for "Jet Distributor for End-Wise Pneumatic Partitioning of Disk Pack" filed by H. Ragle et al. and commonly assigned herewith, this being incorporated herein by reference.

Prior "isolation packs":

In some typical prior versions of such pneumatically-partitioned floppy packs, no particular attention has been paid to "isolation means" serving to couple the ends of a floppy record-disk pack (record pack, RP) from respective end-plate means, while isolating it therefrom to prevent interference. This invention is directed toward end-plates associated with such isolation means. The invention is particularly apt for such packs wherein means are also provided for directing separation air streams axially of the pack—e.g., to the record-gaps (between record disks—to open these for transducing) as well as to the "isolation-gaps" between isolation-disks.

Thus, in one preferred embodiment the invention will be seen to comprise an axially-partitioned pack of recording disks flanked by upper and lower "dummy" (isolation) packs, these in turn flanked by respective (upper, lower) end-plates improved according to this invention. Partition holes are provided through all the disks, with annular "rim means" provided to surround these holes and afford better pneumatic isolation as well as providing a surface for disk support. Preferably, each "recording gap" (space between recording disks) has at least one of these rim means broken-away (at least partly, and preferably so as to divert air radially inward) so that the associated partition air jet will be circulated more widely as the pack rotates. Preferably, such rim means are also combined with an inner "hub-rim" to isolate the hub (spindle) area, to deflect and distribute gap air and to cooperate with rim means in creating a solid support surface for adjacent disks. Such a rim and rim means will be seen to direct and divert partitioning-air along the plane of the disks for good pneumatic partitioning.

Prior art "floppy packs":

Workers in the art have, of course, considered various techniques for providing flexible disk packs. For instance, in cited U.S. Pat. No. 3,969,767 to Griffiths et al. (and in references noted therein) attention is directed to semi-rigid washers, coaxially disposed to form an air-permeable spindle for coaxially supporting flexible record disks. Such washers have radially extending passageways and teach a rotating tubular spindle with means for supplying gas thereto to be distributed radially outward from the hub of such a pack through such air permeable washers. A rigid stabilizing plate at each axial end completes this assembly. The following IBM technical disclosure bulletins also show stacks of flexible disks with various means of partitioning suggested: IBM-TDB August '77, page 914; IBM-TDB of April 1977, page 4229 (showing "vent holes" for self-ventilation of the pack, except for provision of a relatively non-apertured central disk) and IBM-TDB of November 1974, pages 1710, 1711 (where a record pack is flanked by upper and lower dummy packs including disks separated by ventilation holes to be placed in registry along the stack). Neither this nor any other known prior art has any suggestion of any particular necessary composition or spacing of such "dummy" packs however—as taught herein.

Prior tapered end-plates ("rigid" -FIG. 5E):

The tapered rigid end-plates eP-A, eP-B of FIG. 5E are known and understood as made of molded plastic or a like rigid material and adapted to accommodate the tendency of the outer dummy disks to "flare" at their tips—if such "flaring" is not permitted (and these dummies "confined") the overall dummy pack will undesirably disturb record disks (in pack R-P).

While such rigid tapered plates serve certain desirable functions, they also suffer certain drawbacks. For instance, one set "taper angle" α (FIG. 5E) is not optimum for all conditions. That is, variations in the dimensions and/or number of the pack disks (record-and/or dummy disks) and at times in pack rotational velocity can vary the optimum taper angle. Hence, it is preferable to provide end-plates which are somewhat flexible and which can accommodate variations in "taper" of the kind suggested. (As opposed to the rigid structure of FIG. 5E which obviously is pre-set to one taper angle).

The subject invention teaches a novel "tapered", or "delta-shaped" kind of floppy end-plate, one comprised of plural stacks of abuting flexible disks, separated, adjacent their hub, by a "wedge-spacer". This structure improves considerably upon rigid end-plates, while, quite surprisingly, still providing essentially all their necessary characteristics, such as sufficient rigidity (once spun-up to the proper rpm), etc. More surprising—such a "flexible tapered plate" evidently affords a superior "pneumatic couple" better to adjacent dummy disks, allowing them to more naturally equilibrate at a "natural" position and configuration during the contemplated rotation. And, in the course of this, the "dummies" seem to "settle down" better, avoiding any adverse influence on the record pack—evidently because of the flexible, pneumatically-compressed nature of these "delta-shaped", or tapered flexible end-plates.

Prior flexible end-plates; "single stack" type (see FIG. 5B):

A "single stack" flexible end plate has been suggested (see U.S. Ser. No. 124,750, filed Feb. 26, 1980 by Herbert U. Ragle and Dean DeMoss, entitled "Improved Partitionable Pack with End plates" and commonly assigned now abandoned in favor of Ser. No. 433,180, Oct. 6, 1982, U.S. Pat. No. 4,514,778), but can be improved upon. One such problem is "dummy collapse", illustrated schematically in FIG. 5B at "outer" dummy disk 3A-a and adjacent dummy 3A-b—these being understood as "trapped" ("confined") and compressed by forces adjacent "single-stack" flexible end-plate eP during contemplated rotation. This is a problem related to the mentioned "clumping" and related anomalous action of dummy disks and can disturb the normal desired spacing and configuration of the dummy disks—and, sometimes, of adjacent record disks.

As one resolving feature, this invention teaches providing a flexible end-plate formed in a "delta-shape" with two (or more) stacks of abutting floppy disks. Such an end-plate eliminates such compression of dummy disks and related difficulties, while providing an improved "inward-tapered" surface confronting the dummy pack and adapted for better pneumatic coupling thereto.

The present invention is directed toward providing improved flexible disk packs—these being better adapted to meet the foregoing and related problems and objectives. A related object is to provide better isolation means and end-plates at both ends of a stack of floppy record disks. Another object is to do this in a mass memory disk file.

The foregoing and other features, objects and advantages according to this invention will be more fully appreciated and will become more apparent upon consideration of the following description of the preferred embodiments taken in conjunction with the attached drawings, wherein like reference indicia denote like elements.

BRIEF DESCRIPTION OF THE DRAWINGS

FIGS. 3 and 4 show respective forms of a disk for such a pack, as modified with a "rimmed" inter disk spacer formed from two half spacers pressed "back-to-back"; while

DETAILS OF PREFERRED ENVIRONMENT

Improved end-plate means is taught, this being intended to afford better air separation of the floppy disks in packs as aforementioned according to the invention. First, a preferred environment apt for use of the invention, will be described, in connection with the showings in FIGS. 1–10.

Figure 1:
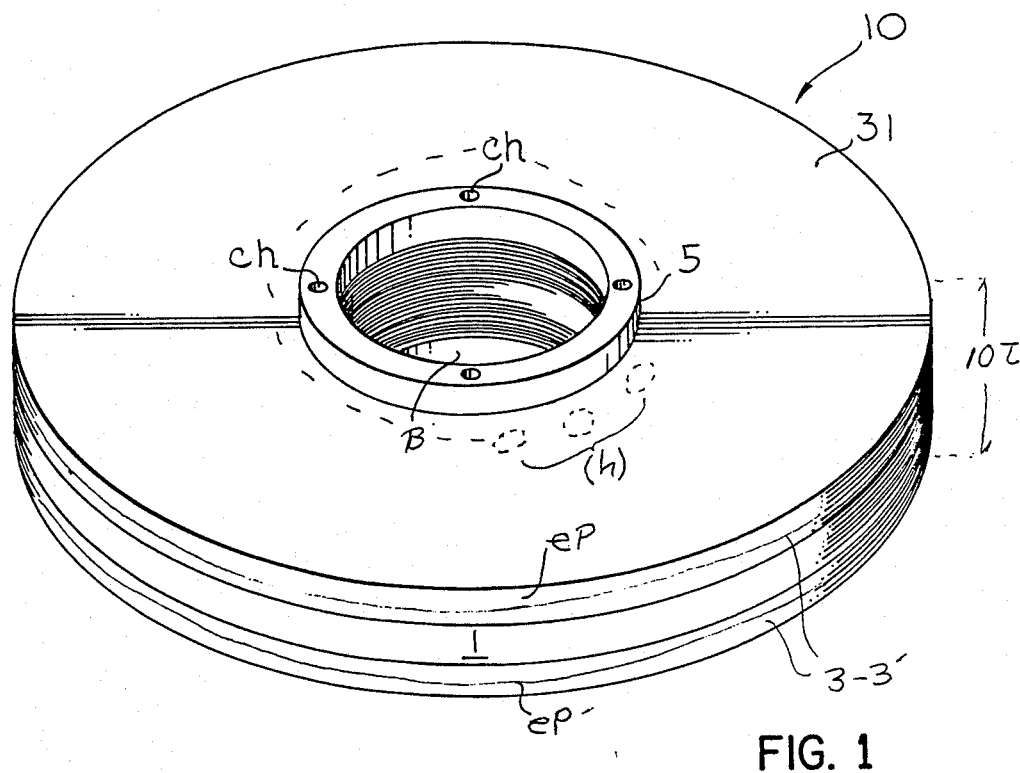
FIG. 1 is an upper perspective, rather schematic, showing of a flexible disk pack adapted for using the subject invention; with FIGS. 5A–5G showing portions of such a pack in various aspects of partial schematic side section.

Overall Memory Module; FIGS. 1–10:

A composite flexible magnetic recording disk unit or memory module 10 is shown in FIGS. 1 and 5 and will be understood as adapted to impart improved axial partitioning characteristics. Further details of these and related environmental elements will be evident in the above-cited Application. Except as particularized herein, all elements, devices, components, etc., and all associated methods of making and using them will be understood as implemented according to good practice prevailing in the art today.

Unit 10 will be understood as comprised of three multi-floppy disk packs, with spacers between all floppy disks: i.e., a recording pack 1, flanked by a pair of upper/lower "dummy" packs 3, 3', plus associated outer end-plates eP, eP', or "stiffeners". Unit 10 is adapted to be conventionally engaged by a known rotation means (like those used with other high performance floppy pack arrangements and involving disk rotation on the order of several thousand rpm or more). Disk rotation, transducer operation and associated control means will be understood as provided by conventional means (not shown here).

That is, recording pack 1 comprises a stack of like flexible recording disks (e.g., d-1, etc., preferably of a 1.5 mil polyethylene terephthalate) stacked in registry for high speed rotation, being separated uniformly by cylindrical washers, or "spacers". Here, "separation air" and "partition-air" is to be drawn axially, via partition holes h, through the disks and the spacers as more completely detailed in U.S. Ser. No. 960,267, filed Nov. 6, 1978 for "Partitionable Record Pack" by Dean DeMoss and Herbert U. Ragle now abandoned in favor Ser. No. 155,366, June 2, 1980, U.S. Pat. No. 4,670,803 (hereby incorporated herein by this reference).

Each "dummy" pack 3, 3' is further detailed below and may generally be understood as comprising an outer stiffener (cf. end-plates eP, eP' mentioned below) and an array of adjacent spaced supporting flexible disks, or ("dummy" disks dB-A, etc.), these being separated by spacers (sufficient disks dB to accommodate a prescribed maximum deflection of record disks d). This will also accommodate a prescribed maximum deflection upon head entry—without detracting from the normal flexible disk/head engagement familiar to those in the art of floppy disk recording with stacks of floppy disks. The planar end plates (or stabilizer plates) would conventionally comprise a rigid plate, or a stack (e.g., 30) of contiguous un-spaced floppy disks, like the disks in packs 1, 3, 3'—each such floppy end-plate to be centrifugally "spun-flat" once the array 10 reaches nominal rpm (as detailed in U.S. Ser. No. 960,267 cited elsewhere). The end-plates are, as needed, apertured with partition holes and fastener-holes adapted to register with those through the disks and spacers (congruent patterns) as indicated functionally in FIG. 5A.

Dummy packs 3 and 3' are provided to offer a smooth transition between the adjacent rotationally-stiffened end-plate and the deflecting motions of the recording disks in pack 1, during partition deflection. Thus, each dummy stack serves to separate the closest recording disk d from an (otherwise-adjacent) end-plate by a prescribed distance which allows maximum partition-deflection thereof, while still isolating it somewhat from "high pneumatic impedance" zones adjacent that end-plate.

The record and flanking "dummy" packs are all held together in one integral disk unit, (module 10) by rigid relatively conventional retaining plates, such as collars 5, 5' illustrated and their associated fasteners (e.g., connecting rods, not shown). Details may be seen in the cited applications.

The central bore B (see $H_c$ in FIG. 3), or hub channel, may be any convenient size to accommodate rotation coupling means. Unlike conventional hub-holes, however, it will not be required to admit "partition air" or "separation air" (to be passed through the spacers radially into the gaps between floppy disks). This is because such air can, instead, be introduced via partition holes h as noted below.

Record Pack 1:

In its preferred form, the record pack 1 will be understood as preferably comprising a stack of like flexible recording disks stacked in registry and uniformly separated by like spacers, with the supporting "dummy-disks" being provided to accommodate the expected partition deflections and resilient engagement of such recording disks with an associated transducer. (A typical known rigid "floppy disk transducer" such as transducer TR, FIG. 2, being preferred, as known in the art). Pack 1 is here preferably comprised of about 20 floppy disks (1.5 mil each), stacked to be each uniformly separated by a rigid spacer/washer (e.g., made of metal, plastic or the like—disks and spacers being perforated with the mentioned holes h, ch).

Figure 2:
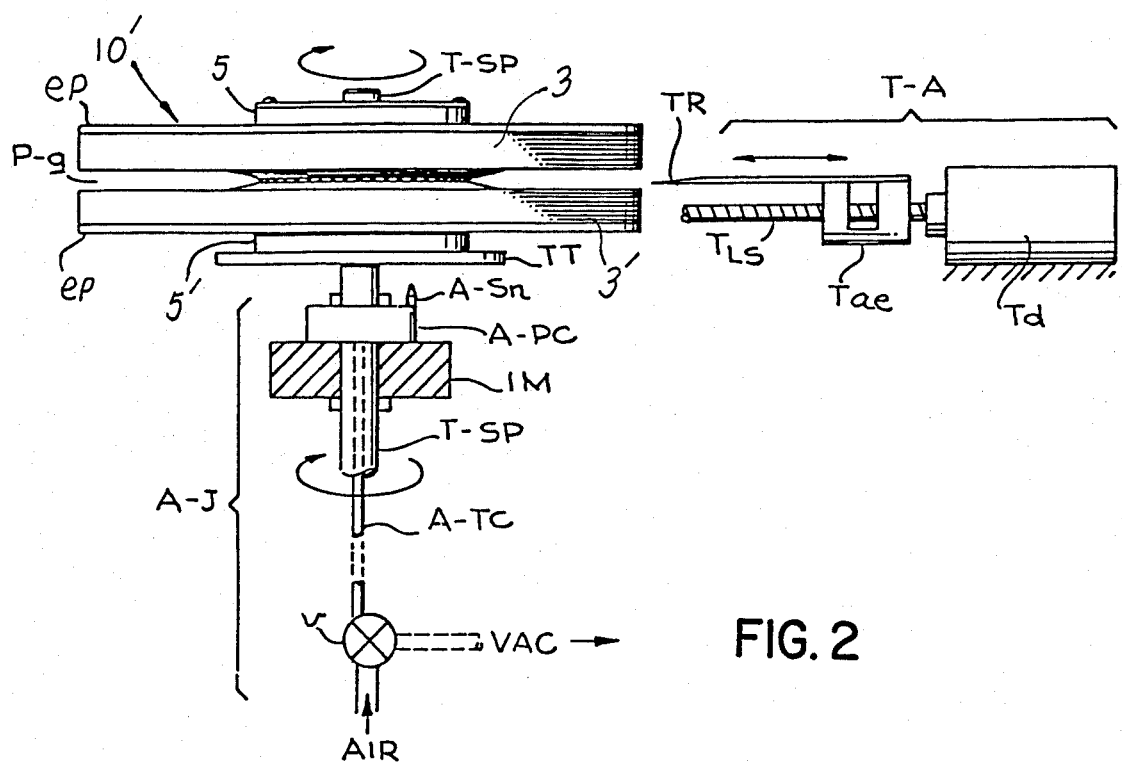
FIG. 2 is a rather schematic elevation showing a simplified exemplary arrangement for "end-wise" pneumatic partitioning of such a disk pack, along with means for rotating the pack and means for selectively injecting a transducer assembly into the pack.

Pneumatic, axial partitioning; FIG. 2:

FIG. 2 schematically suggests how a floppy pack embodiment like that of FIGS. 1 and 3–5 may be partitioned axially, or "end-wise", and pneumatically (for more details please refer to U.S. Ser. No. 960,267 cited above).

Thus, FIG. 2 is a schematic, rather generalized functional showing of a flexible disk unit 10' mounted on a conventional spindle T-SP and turntable TT (for relatively high speed rotation; unit 10 being understood as generally the same as unit 10 described above, being retained between a pair of collars 5, 5'). A pneumatic partition assembly AJ will be understood as adapted to pneumatically partition the record pack 1 (between dummy packs 3, 3' as in FIG. 1) for access entry of a conventional transducer array TR, adapted for high speed transduction as generally understood in the art. Here, and elsewhere, the materials, mechanisms and systems alluded-to should be understood as conventionally constructed and operated as presently known in the art, except where otherwise mentioned.

For illustration purposes, a conventional transducer array TA is very functionally indicated and understood as adapted for selective translation (as indicated by arrow) into, and out of, partition gap g between recording disks in pack 1 so as to present the transducer array TR in transducing relation with a prescribed disk surface. The partitioning air supplied by partition jet assembly AJ is adapted to present a high speed jet of partitioning air end-wise of unit 10', to be entrained up a prescribed one of the bores generated by the array of registered partitioning-aperatures h in the spacers and disks. This selection may be controlled according to the rotational position, or indexing, of a delivery jet nozzle A-SM relative to unit 10'.

Figure 3:
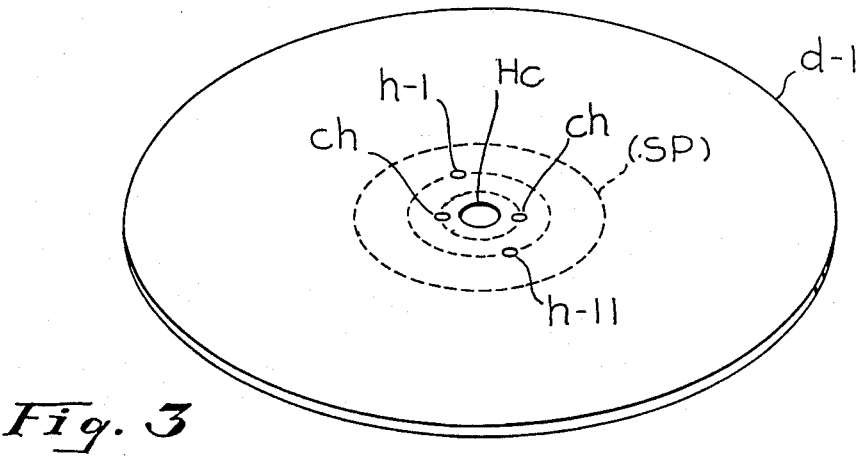
Figure 4:
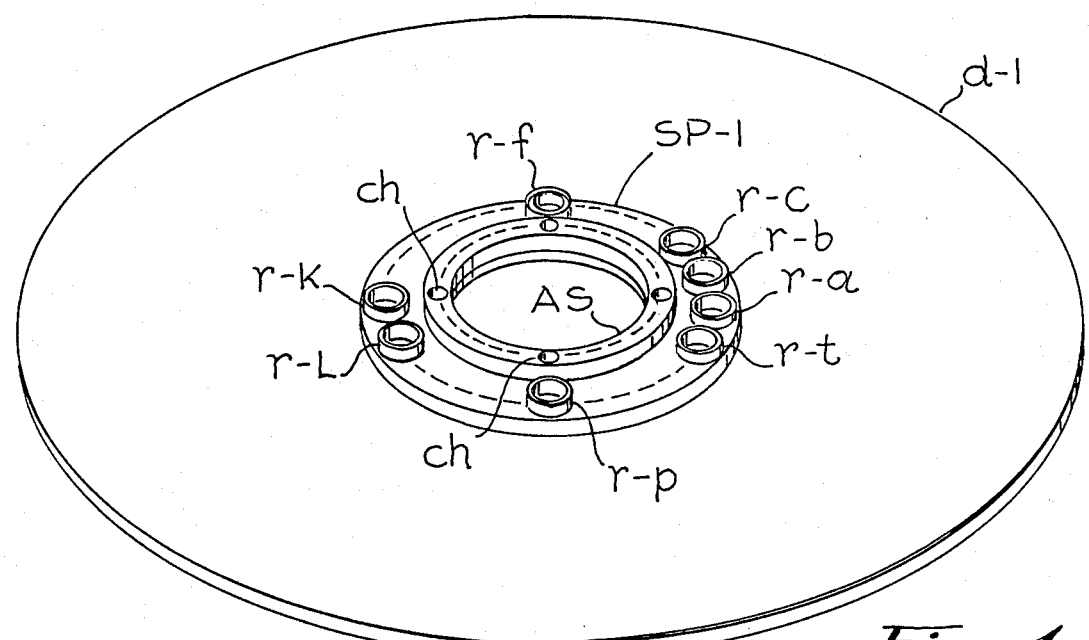
Figure 4A:
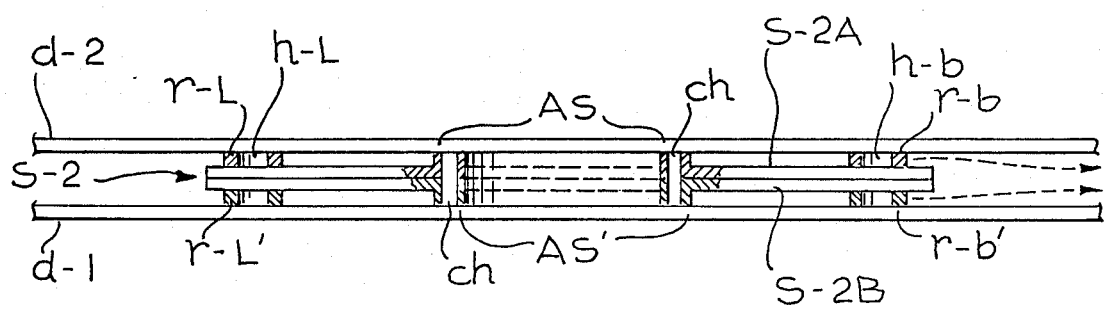
FIG. 4A shows a schematic sectional view of such a half-spacer in place between floppy disks.
Figure 5A:
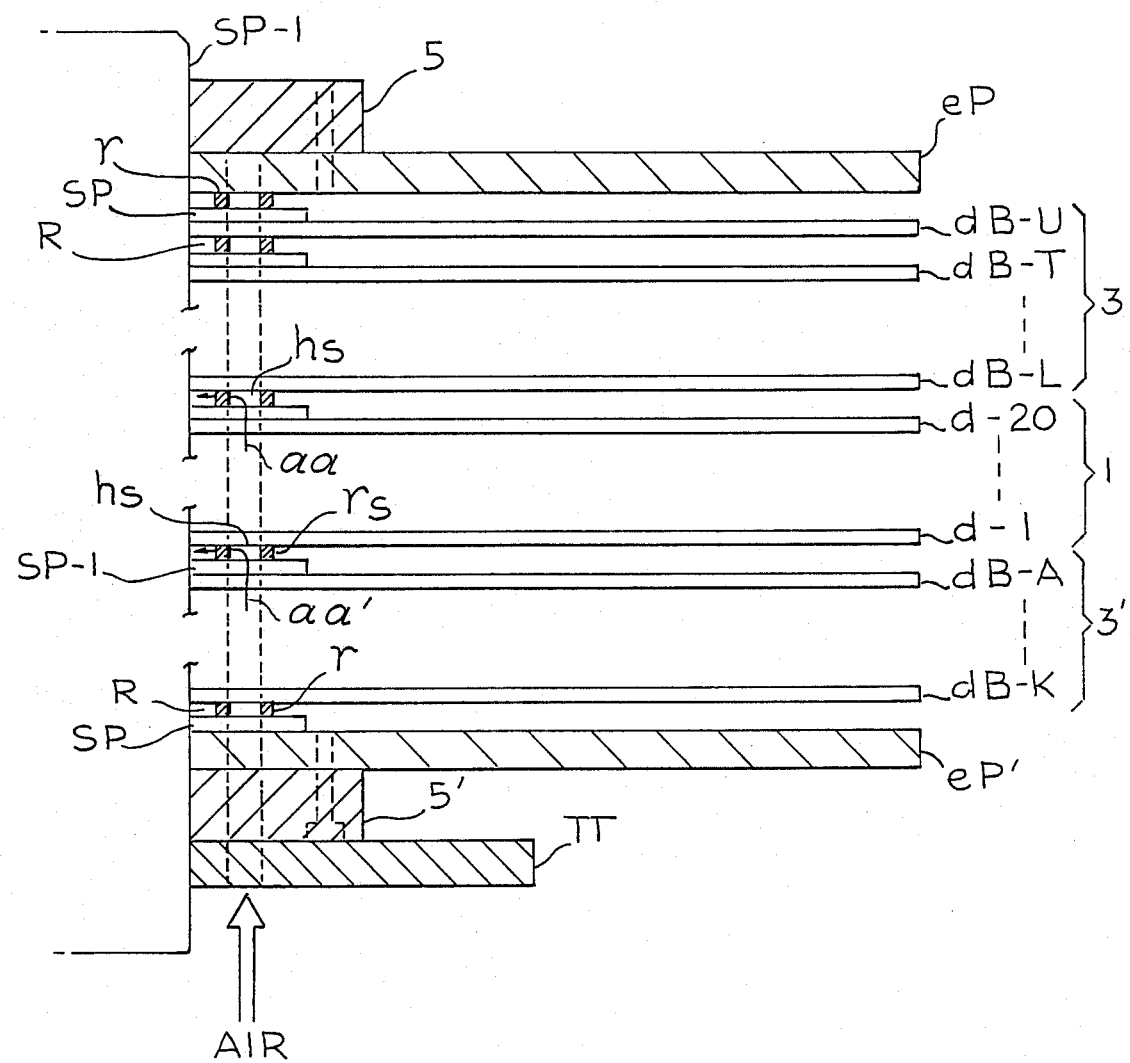

"Rimmed" partition-holes; FIGS. 3, 4 and 5A:

FIGS. 3–5A indicate how the circumferential array of partition holes h are disposed in registry through the disks and intermediate spacers (so stacked) to form an array of "partition bores" extending axially of unit 10. More particularly, they indicate how air conduit means, or "rims", may be used to supply effective air conduction along such bores, between disks; while also providing an annular "support-plane" (made up of a circumferential array of rims, e.g., the top surfaces of rings r-a through r-t in FIG. 4). Cited companion U.S. application U.S. Ser. No. 172,234 and U.S. Ser. No. 156,197 now U.S. Pat. No. 4,345,285 and U.S. Pat. No. 4,352,135, respectively may be consulted for details.

Now, at first, it appeared that isolation or separation air could be introduced through the spindle hole and, passing through the openings in fenestrated rim AS' could adequately partition its respective gap. However, it was later observed that this mode tends to introduce insufficient air, "starving" the gap (e.g., between dummy disks) and inducing the flanking disks to collapse upon one another.

According, it is preferable to introduce separation air (e.g., even for the dummy-gaps) through the partition holes h—assuming sufficient holes are available for this. For instance, one or two particular partition holes may be set aside for use in common by all dummy disks; alternatively, each dummy-gap can be "slaved" to a respective recording gap and so caused to share the air therewith, according to this invention, as detailed elsewhere.

Invention context; FIGS. 5A–5E:

With the foregoing in mind, a preferred context for the invention may be gleaned from the following description with reference to FIGS. 5A–5E.

Thus, in FIG. 5A is shown a floppy recording pack 1, flanked by two dummy packs or isolation means 3, 3'; with these in turn flanked by respective end plate means eP, eP'—these preferably taking the forms described above (pack 1 comprising disks d-1 to d-20, separated by like spacers SP in inter disk gaps g—dummy pack 3 comprising similarly spaced dummy disks dB-L through dB-U and pack 3' comprising similarly spaced dummy disks dB-A through dB-K).

We have found that it is important to use sufficient dummy disks and intervening spacers to isolate a respective end-plate from the recording pack (as described above); as well as to optimize the interaction between end plate and the recording pack, while minimizing the mass of the intervening dummy pack.

This is done preferably by focusing on the "outer-gaps", that is the gaps just beyond the end of the outermost recording disks and separating them from the closest adjacent dummy disk (e.g., in FIG. 5A note "outer-gap" g-o between the bottom most recording disk d-1 and adjacent dummy disk dB-A and a companion outer gap g-o' between the uppermost recording disk d-20 and the adjacent dummy disk dB-L). More particularly, it has been discovered that if the dummy pack is insufficiently thick (that is, has an insufficient number of dummy disks and intervening spacers and/or if it is "air-starved") such an "outer gap" would tend to be non-uniform—at times "divergent" as indicated at displaced gap $g_d$ in FIGS. 5B and 5C (as opposed to normal, uniform gap $g_n$, between relatively flat, level disks d-20 and dB-L shown in phantom in FIG. 5C and in-full in FIG. 5D).

This is illustrated, for instance very schematically and functionally, in FIG. 5C where the gap is seen as expanding in height proceeding radially to terminate at a maximum $g_d$ well beyond the norm of uniform gap-height $g_n$ and beyond its normal position. This displaces upper disk dB-A and its subjacent gap(s) undesirably. And, in a parallel reaction, the associated "dummy-gaps' (that is, gaps in this dummy pack) would tend to be relatively non-uniform, with the dummy disks tending to "clump" and separate as described above, as well as to "pull-in" the adjacent record disk d 1 (all three effects indicated in FIG. 5B). All this produces undesired discontinuities in the positioning and configuration of the record disks. This is believed due, in part, to a state of "under-pressure" between some or all of the dummy disks, whereby they tend to "clump together" and whereby ambient air tends to be drawn-in between clumps as indicated by the arrows in FIG. 5B. Such under-pressure may be said to render the dummy pack "inspiratory", with ambient air being sucked-in and adjacent record disks pulled toward the dummy pack.

And, as these "inspiratory" effects tend to pull dummy disks away from the record pack 1 (with one or several adjacent record disks following), it was observed that control over partitioning is badly degraded—at times lost! That is, the adjacent "outer" record disks (e.g., #1, #2 or #19, #20) tend to have their gap height reduced, while conversely th "inner" disks (e.g., #9, #10, #11, #12) have their gap height enlarged. This, in turn, makes it even easier (than normal) to pneumatically "split" the inner disks and even harder (—at times impossible) to split the outer ones, no matter what the partition pressure. In some cases, an attempt to split a certain gap results only in a different gap opening up.

It was discovered that this condition can be alleviated simply by increasing the size of the dummy pack and/or increasing the thru-put of separation-air flow through the dummy-gaps, uniformly, until this outer gap becomes relatively uniform and the other associated undesirable effects are also substantially alleviated thereby.

It has also been discovered that it becomes more difficult, in general, to pneumatically open a gap the closer one gets to the stiffener—e.g., referring to FIG. 5A at a given air flow, etc. one finds it harder (e.g., more cfm needed) to split the gaps outside records d-9 or d-12 than those outside "central" records d-10, d-11; and it is considerably harder to split the gaps outside records d-1, d-20; and it is even harder to split the gaps in the isolation packs 3, 3'.

Thus, with the above in mind, one should provide dummy-(isolation)-packs as indicated of sufficient thickness and air-flow to accommodate maximum deflection of the "nearest" record disk as well as rendering it readily "splittable" with the available air flow, while also curtailing "inspiratory" effects to leave the record disks flat and stable.

Dummy packs; size, air flow:

Here, and elsewhere, it will be understood that satisfactory pneumatic partitioning ("splitting") of the record gaps will involve opening the selected gap when called for; keeping it open and stable sufficient to permit transduction in the so-opened gap; and thereafter closing the gap upon command. And workers will appreciate that the air flow through a record gap should not rise above a certain nominal value of pressure/flow (peculiar to each array) lest undesired turbulence result, detracting from the desired "laminar" flow and stable unfluttering disks. Thus, a prime consideration will be to provide for such pneumatic partitioning at the minimum air flow (cfm).

Assume that stiffener eP in FIG. 5B is constructed and operated to normally lie relatively flat during pack-spin, at least along the side facing the dummy pack 3. Also assume that record pack 1 is likewise arranged and operated so that its inter-disk gaps will be relatively uniform. If one starts with a relatively few dummy disks dB (e.g., about 4 for a 20-disk record pack 1 of the type described above), we find that the outer gap g-o' (FIG. 5A) will typically be "divergent" as indicated very functionally in FIG. 5C (gap g-o similar)—also assuming that the module 10 is otherwise generally as aforedescribed, for instance, with each disk d, dB being the same and about 1.5 mils thick and with all spacers being about the same thickness such as about 12 mils each.

Now if the size of dummy pack 3 is simply increased (more dummy disks and intervening spacers) to comprise about 10 dummies with intervening spacers, we find that this outer-gap becomes less divergent. If one also sufficiently pressurizes the dummy gaps (e.g., by slaving to record gaps as seen below) the record gaps lose all divergence and become uniform (as functionally indicated in FIG. 5D) and other related problems seem to be alleviated too. More particularly, the clumping and other discontinuities of dummy gaps are substantially alleviated and the adjacent record disks are not pulled-in ("inspiratory" effects abated).

More than about 10 dummy disks and intervening spacers doesn't seem to improve things much, here, and has the undesirable effect, of course, of adding unnecessary mass to the dummy pack—assuming that 10 such dummy disks gave the proper isolation, etc., between the recording pack 1 and the adjacent end-plate eP.

According to a feature, related to this optimization of the size and composition of flanking dummy packs, we have discovered that it can be advantageous to "pressurize" (increase radial outward air flow) dummy-gaps by "slaving" each to a respective record disk gap. That is, when the "dummy-gaps" (between disks in dummy or isolation-pack) begin to close under such "clumping" and exhibit other "inspiratory" effects, some record-gaps will be observed to shift and expand at their outer edge (e.g., as adjacent dummy disks pull away). This can cause a loss of control over partitioning, as workers will imagine. Conversely, when the dummy-gaps are sufficiently pressurized, such inspiratory effects are abated (e.g., and record gaps become more uniform).

Figure 5F:
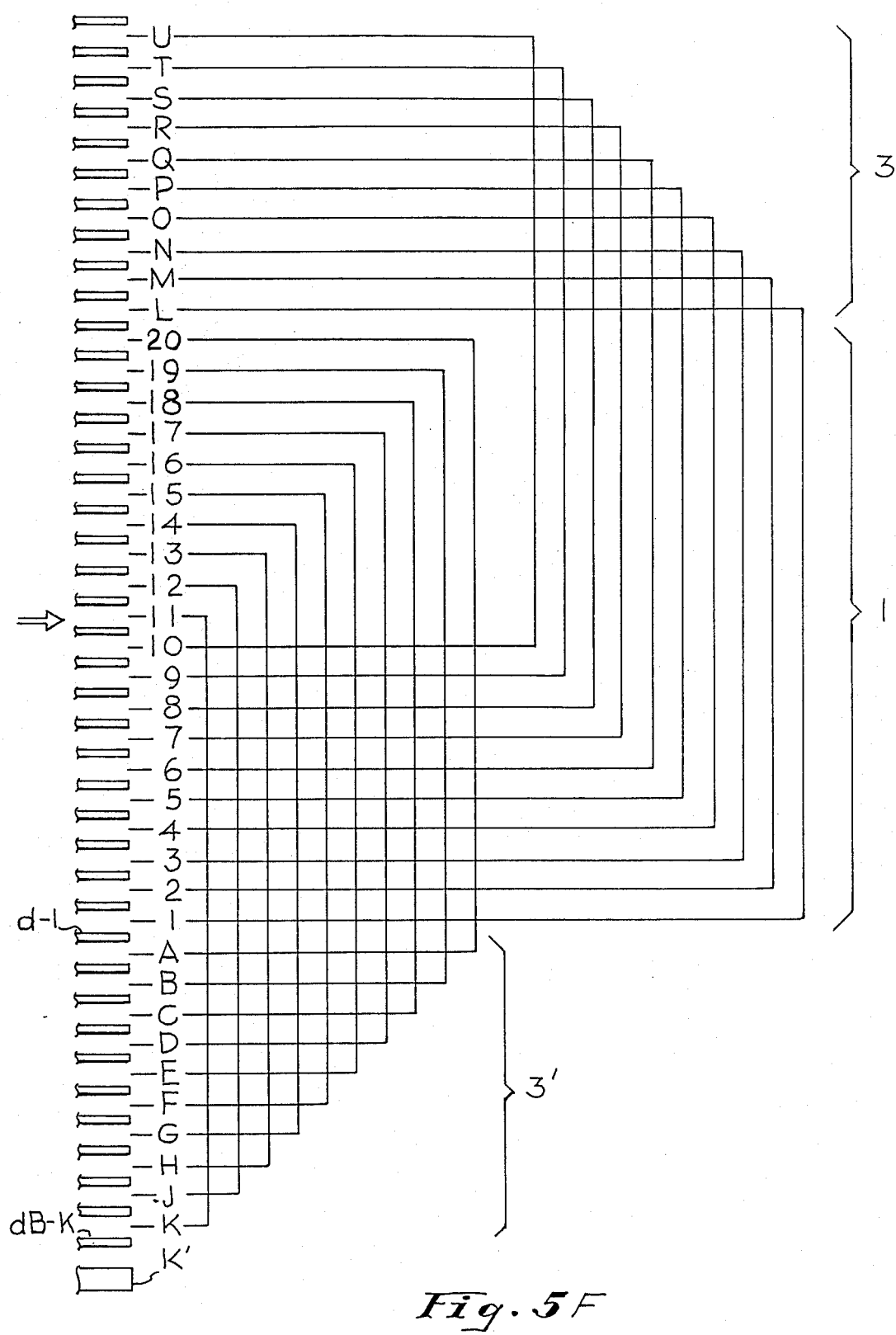

One simple, convenient preferred way of so pressuring the dummy gaps—according to a feature hereof—is to "slave" each to a respective record gap so their pneumatic thru-put is "shared". An example of this is schematically indicated in FIG. 5F. FIG. 5F, very schematically depicts all gaps in FIG. 5A; i.e., record-gaps 1-20, above record disks d-1 to d-20, respectively, plus dummy-gaps L U and K through A, above like identified dummy disks dB-L to d-U and dB-K to dB-A—only the tips of the disks being shown, with spacers, etc., deleted for simplicity. Thus, gap 20 (above record disk d-20 in FIG. 5A) is coupled pneumatically to share air flow with (dummy-) gap A (above dummy disk dB-A); and similarly for the other 19 record-gaps.

Figure 5G:
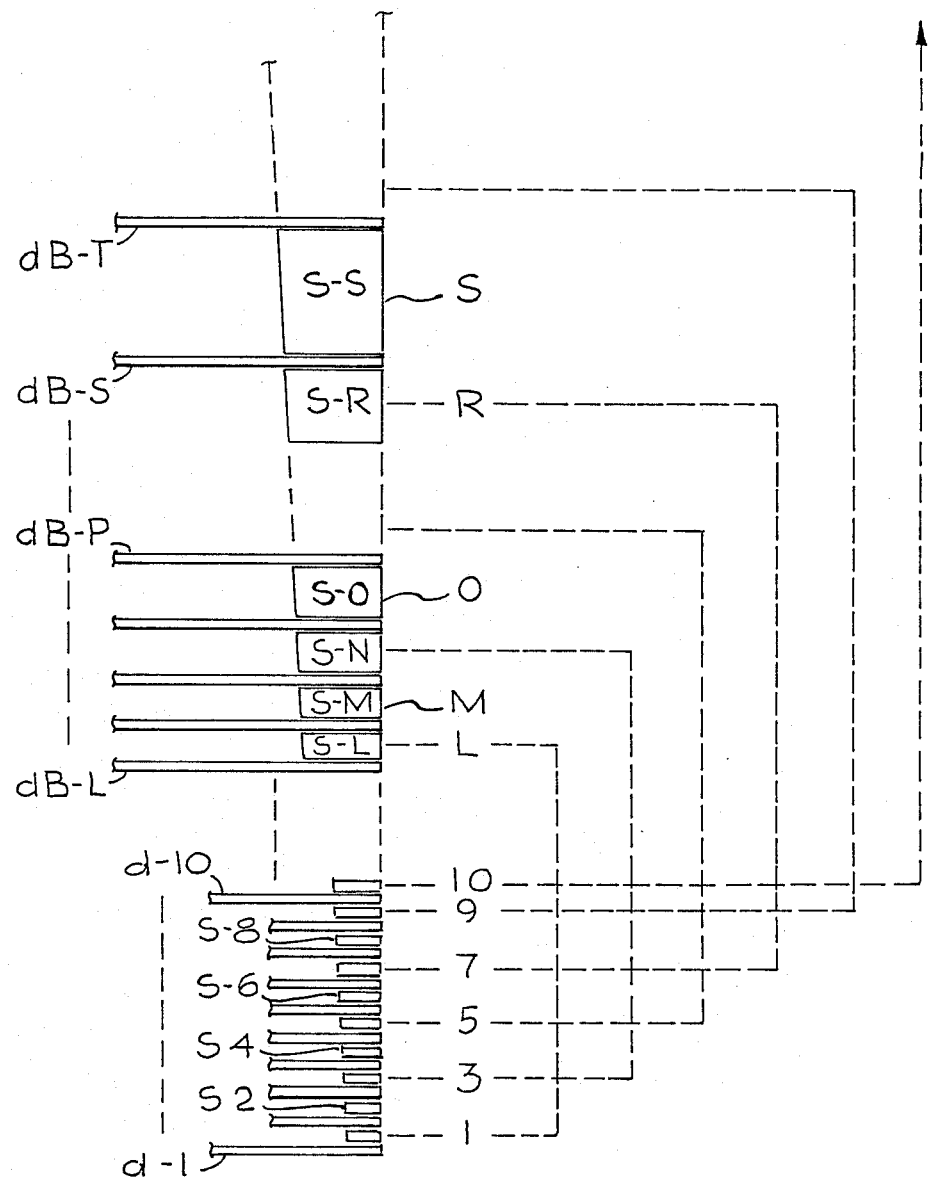

Varying dummy gap heights; FIGS. 5F, 5G:

According to a further, optimizing feature, it is preferable to so slave record-gaps to dummy-gaps as remote as possible, thus minimizing possible inter-gap interference (e.g., "flutter" at one dummy-gap being coupled to its companion record-gap during split-pressurizing). Thus gap #1 is slaved to #L, #10 to #U, #11 to #K and #20 to #A, and others accordingly.

It is also preferable to vary the height of dummy spacers according to which record-gap they are slaved-to—with "inner" record-gaps like #10, #11 each slaved to a dummy gap having a relatively large spacer height and "outer" record gaps slaved to those with a relatively small height, with intermediate dummy-gaps "graduated" therebetween—e.g., as shown in U.S. Ser. No. 172,234 (incorporated by reference). This is because it is found that such "outer" record gaps are considerably more difficult to partition than "inner" record-gaps.

Similarly, we have also discovered that the "outer" dummy-gaps are harder to "split", i.e., as one gets closer to the stiffener it takes more air flow to open a gap. Further discussion and details on these "dummy" features may be gleaned from our cited docket U.S. Ser. No. 172,234.

FIG. 5F indicates a "variable dummy-gap" slaving pattern very schematically, with gap-connecting lines drawn (e.g., between record-gap #1 and dummy-gap "L", etc.) to denote which gaps "share", i.e., where each is slaved, being coupled in common to a given pneumatic conduit, such as to a particular "bore" (formed through disks and spacers by registering holes therein).

Here, in essence, the outermost, relatively air starved, record-gaps are coupled to the innermost, relatively air-flush, gaps of a ("remote") non-adjacent dummy pack. It was found—quite surprisingly—that so "slaving" record-gaps to dummy-gaps results in an unexpected improvement in the uniformity of the dummy gaps (across the entire dummy pack, as well as compared to one another) with significant alleviation of the aforementioned "clumping" and related "inspiratory" effects and problems.

The exemplary memory module 10 assumed for FIG. 5F will be understood to be the same as aforedescribed (except for the varying dummy-gaps); e.g., to include about 20 record disks (1.5 mil stock) each separated by a 12 mil spacer, with each dummy pack comprising about half this number of like disks and spacers.

It may also be assumed that separation air is supplied by source means (e.g., a single pump, etc.) that is, preferably, "time-shared" between a "quiescent mode", when all gaps (dummy and record) are supplied with normal separation air, and a "select mode", when only the "selected" record gap receives air. Conventional, known valving means, (not shown) can implement this.

Figure 4B:
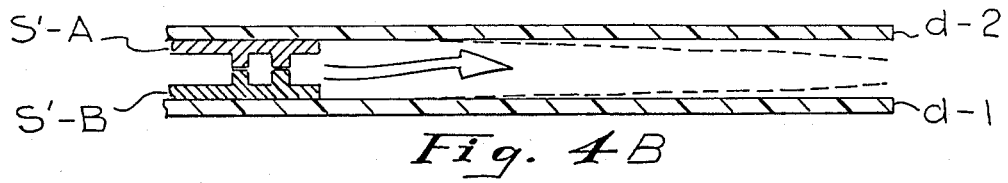
FIG. 4B is a like view of two such half-spacers pressed face-to-face and FIG. 4C is a like view of an array of like "rimmed" spacers, each formed from one integral piece.
Figure 4C:
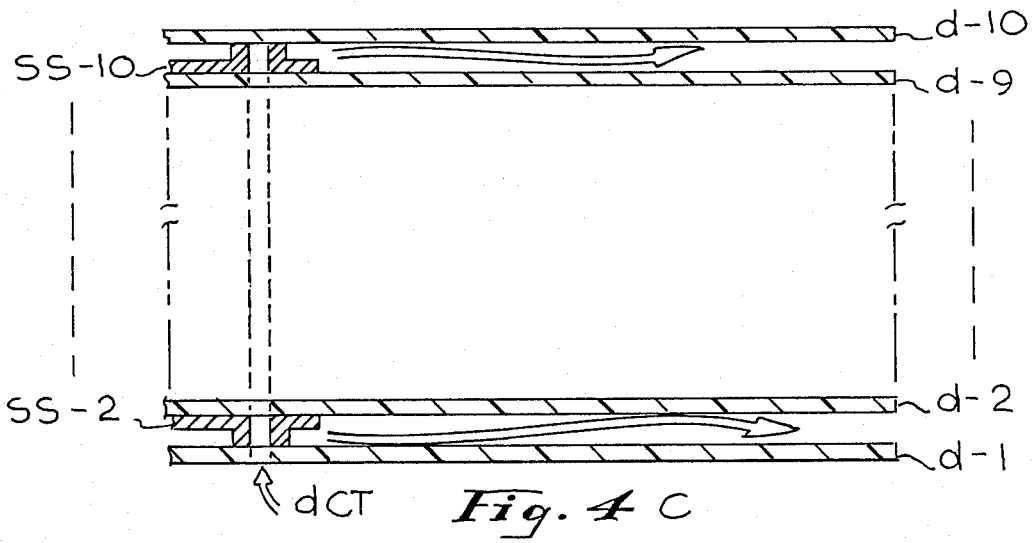
Figure 6:
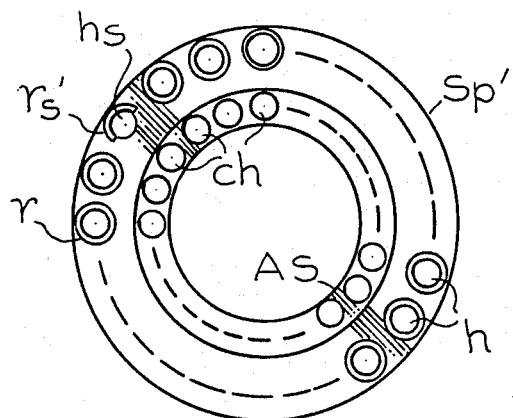
FIGS. 6 through 9 show the same, or similar, types of spacers in plan view.
Figure 7:
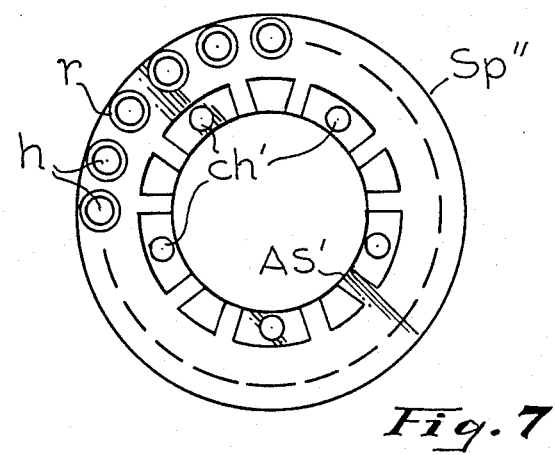
Figure 8:
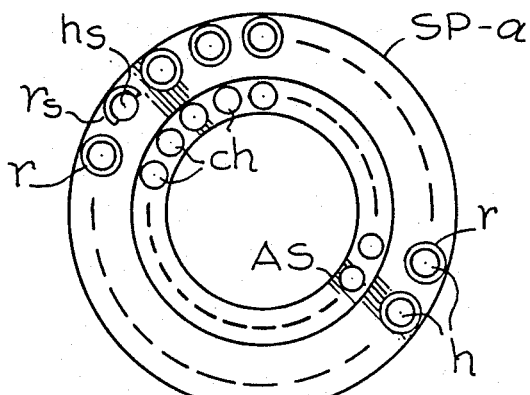
Figure 9:
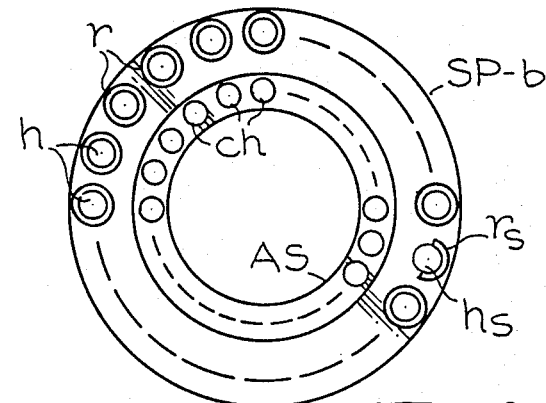

It may further be assumed that all mentioned spacers are preferably fashioned to be "rimmed" as the fashion of bi-part spacers S'-A/S' -B of FIG. 4B above (e.g., thus presenting an orifice, for the airstream, which has a height $h_o$ about half that of the associated gap—i.e., $h_o = \frac{1}{2}$ the total spacer-height—yielding an orifice which is "centered" in the gap).

Figure 10:
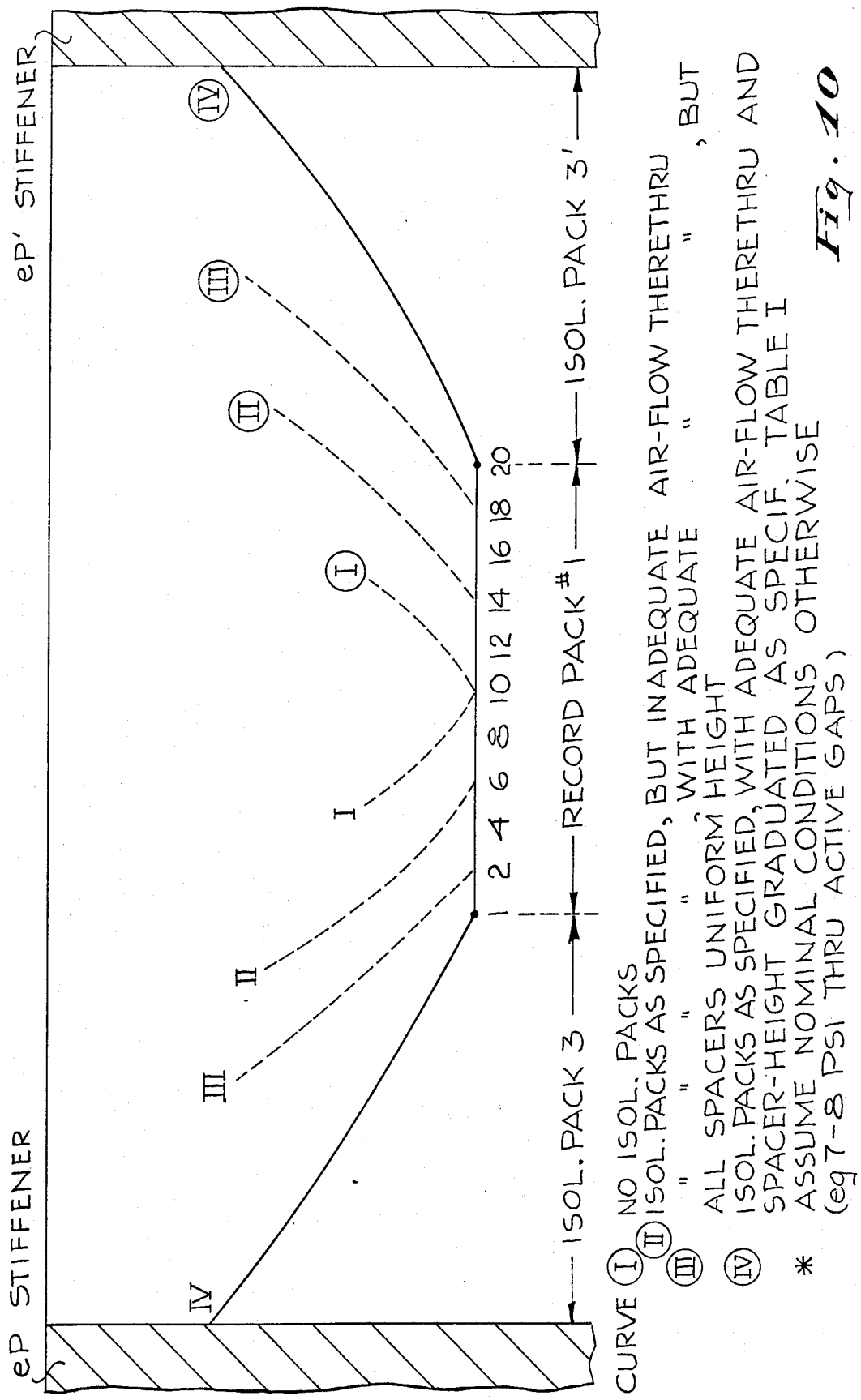
FIG. 10 diagrams various effects on partitioning.

Recapitulation (see FIG. 10):

FIG. 10 indicates very schematically how, for the module and conditions assumed for certain above-discussed characteristics of the "isolation packs" generally result in different pneumatic partition patterns in the record pack 1 (i.e., in gaps #1 through #20; with "nominal" specified conditions prevailing, such as air-flow sufficient to generate 7-8 psi in a selected record-gap, etc.). This sketch is only suggestive and should be interpreted as a very diagrammatic section through the pack between opposed stiffeners eP, eP', with curves I, II, III and IV spanning an illustrative, typical array of "partitionable" record-gaps.

Thus, for the case where no isolation packs at all are used, curve I indicates that only a central (one or two) record-gaps are normally partitionable. Then, adding such isolation packs, without, however, providing for enhanced air-flow therethrough, opens up gaps #6-#14 approximately, as in curve II.

Then, providing such enhanced air flow, adds gaps #2-#6 and #14-#19 approximately as per curve III---unless a "variable height" array of dummy spacers is used (or equivalent as in FIG. 5G, Table I, etc.), in which case gaps #1 and #20 are also partitionable as per curve IV (so long as modified "tapered" flexible end-plates (stiffeners) are also used, or each dummy pack is expanded by about 90 disks and spacers!). Such tapered flexible end-plates are the subject of this invention.

Figure 11:
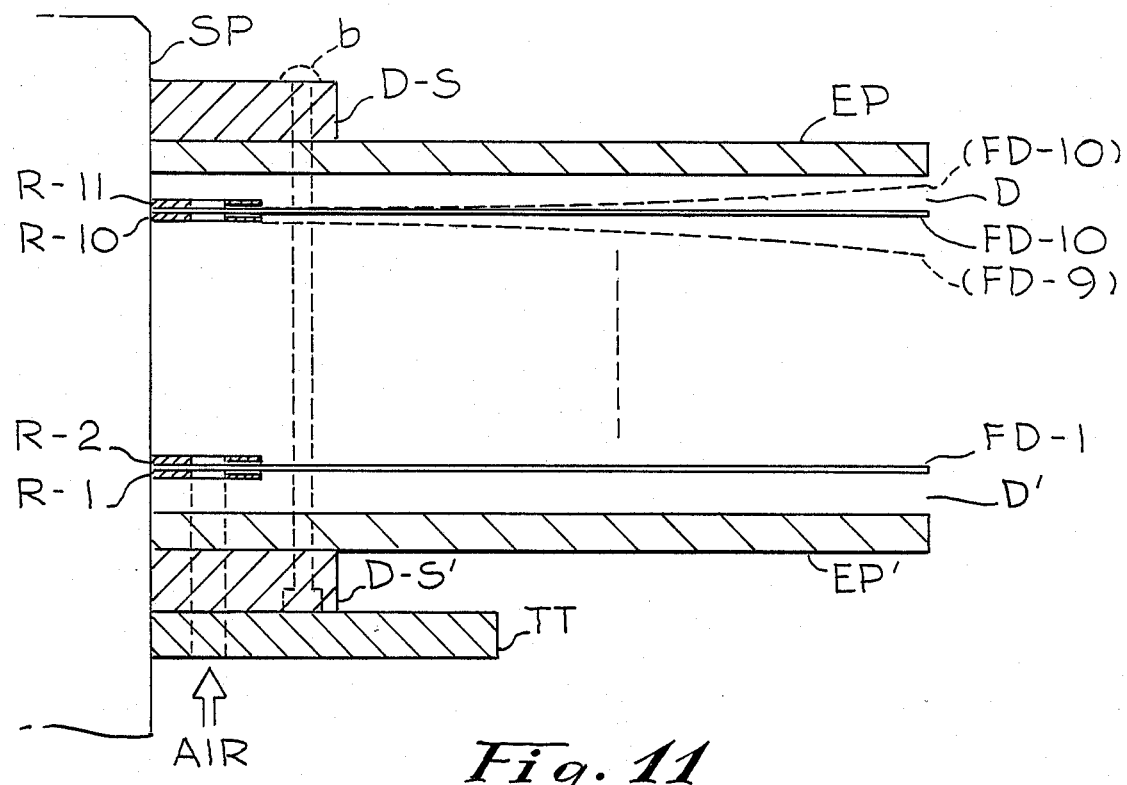
FIG. 11 is an enlarged simplified partial side section of a known floppy pack with a known type of flexible end-plate.

Known single-stack flexible end-plates (FIG. 11):

FIG. 11 shows an examplary arrangement with a stack of 10 separated flexible record disks FD-1 through FD-10, flanked by a pair of isolation packs (D, D'—only schematically indicated) and these flanked by respective "single-stack" type flexible end plates eP, eP'—all mounted for co-rotation on a turntable TT driven by a spindle SP, etc., in known fashion (e.g., refer to cited U.S. Ser. No. 124,750, incorporated herein by reference, for further details).

Disks FD; FIG. 11:

Flexible record disks FD are of the known type above mentioned (preferably polyethelene terephthalate about 1.5 mils thick, including a randomly-oriented ferric oxide 0.25 mils thick on each side; disk diameter being approximately 12 inches, with a "standard" center hole diameter about 2.5 inches). The spacers R may comprise like material and dimensions. Holes ap will, of course, be understood as adapted to accommodate the "interior pneumatic partitioning" mentioned elsewhere, being disposed along a common circumferential axis, closely adjacent center hole CH and within the "recording annulus" defined by a radial segment $A_R$. "Coupling holes" h are provided, as mentioned, to accommodate coupling bolts, or like fasteners, connecting the clamping collars.

According to the preferred construction here indicated, the pattern of partition apertures is arranged and cut-out to be unique for each disk so that all annular spacers (aperture pattern) may be alike. However, for manufacturing and assembly convenience, workers may use other modes. Thus, here—as before—there is a prescribed number of partition gaps possible and an associated number of aperture sites—the latter being the same for all disks and in registry when the pack is assembled.

Here, nine (9) record-gaps p g are assumed, so there are nine (9) aperture sites. All sites are cut-out in the "bottom disk" (closest to air jet—here disk FD-1); while none are cut-out for the "top disk" (FD-10 here, farthest from air jet); with the number cut-out increasing between these two (e.g., eight cut-out on FD-2, seven on FD-3, etc., through one cut-out on FD-9, and none on FD-10).

Of course, as mentioned below, the disks are stacked together with the intermediate similarly-apertured spacers so that these nine ap sites register along the stack of disks to form nine "partition bores" as in the preceeding embodiments; each bore being a different length and thus terminating at a different disk.

Flexible disks FD will be understood as operating between a pair of stabilizing "stiffeners", namely single-stack floppy end-plates EP, EP'. Plates EP, EP' are adapted to exhibit a prescribed compliance and still accommodate a "self-flattening" action under the centrifugal forces generated at the operating rpm. Such a flexible end-plate is quite different from the more conventional rigid end-plates usually used today—yet it is very cost effective and very simple to provide; for instance, preferably comprising a plurality of contiguous flexible recording disks 55 (identical to the record disks, except that no magnetic coating is needed—thus each is 1.0 mil thick). Plates EP, EP' fix the pack position axially and remain quite flat when the pack is spun up, being held so by centrifugal forces. For instance, in one embodiment, with a pack comprising from 10-20 polyester disks 1.5 mil thick separated by 10 mil spacers, adequate end-plates are formed with startling simplicity—simply by pressing about a hundred uncoated 1.0 mil floppies together—these being held together unseparated (e.g., simply by static friction) in a laminar array. Ordinarily, the indicated clamping means—e.g., pressing metal spacers against flexible disk material—will be adequate to hold the relative position of disks and spacers between end-plates.

Of course, it will be understood that, preferably and in most cases, "dummy" disks and associated intermediate spacers (i.e., a "dummy pack") will also be provided at the top and bottom of the record stack (here, adjacent FD-1 and FD-10, respectively) to accommodate a projected full partitioning deflection of record disks—especially the outboard disks FD-1, FD-10. In this case the partition gap p-g is projected at about 150 mils; accordingly, a "dummy pack" D, D' will be provided, top and bottom, each sufficient to accommodate a 75 mil deflection (as compressed by the deflection forces, with essentially no gap between dummy disks).

Figure 12:
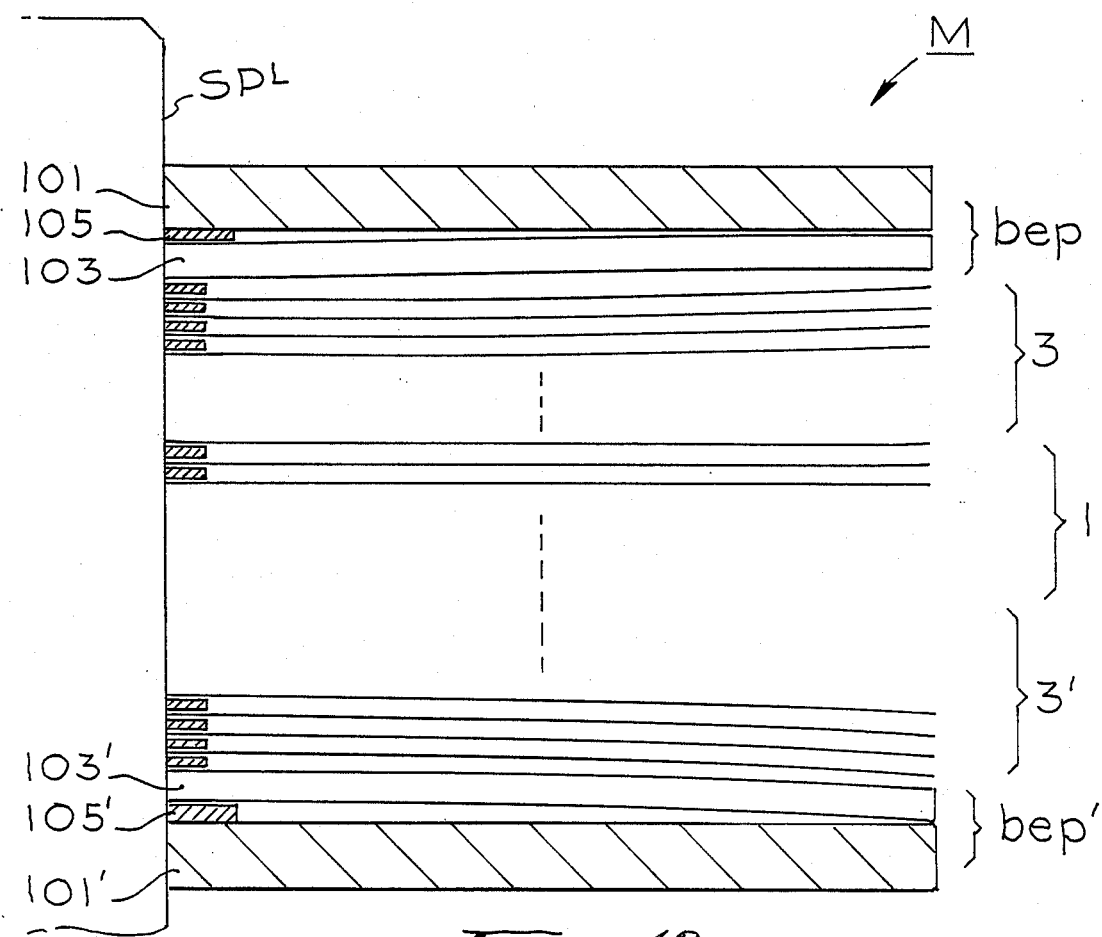
FIG. 12 is a section after the manner of FIGS. 5A, 5E and 11 of a floppy record array including a pair of tapered flexible multi-stack end-plates according to a preferred embodiment.

Preferred Embodiment, Example No. 1; FIG. 12:

FIG. 12 shows, in schematic simplified side section, salient portions of a memory pack M comprised of a stack of record disks 1, flanked by a pair of like dummy packs 3, 3' with these each flanked by a respective tapered multi-pack flexible stiffener (bep, bep', respectively) according to a preferred embodiment of the invention—all these being mounted for co-rotation conventionally (e.g., on rotatable spindle means SPL as indicated). Except as otherwise specified, all elements, techniques, etc. will be understood as carried-out and operated as mentioned for the foregoing like elements and/or according to prevailing good practice. For purposes hereof, all elements except stiffeners bep, bep' may be taken as presently known and/or previously suggested.

Thus, it will be understood that the memory module M is mounted for rotation on conventional spindle means SPL, illustrated schematically here in the contemplated dynamic "spun-up" condition. Central record pack 1 comprises a stack of flexible 10 inch, 1.5 mil disks, all separated by like 12 mil spacers. Outboard of each (upper, lower) dummy pack 3, 3' is a respective (upper, lower) stiffener bep, bep' embodiment. The stiffeners are identical and are, according to a novel feature, not only comprised of floppy disks but are tapered inwardly, toward the adjacent dummy disk (i.e. "delta-shaped").

Dummy packs 3, 3' will be assumed as the same as aforementioned except where otherwise specified (e.g., the same disks as those in record pack 1 except not oxide-coated and thus 1 mil thick) and preferably include a "graduated" array of interspacers in the manner mentioned above and as indicated in connection with FIG. 5G. [As aforementioned FIG. 5G is taken from schematic FIG. 5F where record disks 1-20 are indicated along with a pair of flanking "dummy-packs" dB where, preferably, the flexible dummy-disks are separated by "variable height" spacers S-1, S-2, etc. to form "variable height" dummy gaps A, B, etc., and L, M, etc. There dummy gaps will be understood as, each, coupled pneumatically to an associated prescribed record-gap].

The "tapered flexible multi-pack end-plate" stiffeners are novel. The upper one, bep, is representative and will now be described in detail. Upper tapered flexible end-plate bep will be understood as generally comprising two floppy disk stacks separated by an inner-spacer; namely upper stack 101 and lower stack 103 separated, only at their radially-inner edge (their "hub"), by an intermediate annular separator 105 of prescribed related dimensions (spacer-wedge 105).

Like the "single stack" end-plates eP, eP' discussed above, upper and lower stacks 101, 103 are preferably each formed of abutting flexible disks—e.g., the same as those of the dummy packs; however, being stacked in abutment with no intervening spacers.

This embodiment is summarized in Table II below (following is Ex. #1 from Table II).

Upper stack 101 is comprised of 50 abutting flexible disks, while lower taper-stack 103 is comprised of 30 abutting flexible disks of the same kind and is disposed facing the "inner" side of the so-formed upper plate 101 on one side, facing the adjacent dummy disks on the other side. Separator 105 is of appropriate height and radial width to make stack 103 cant at a proper angle to stack 101 as mentioned below. [This angle is preferably enough for proper vacuum and enough to tilt 103 up toward 101 in bracing, truss-like fashion—it is believed that 103 functions, in part, as a supporting brace for 101, being pulled against 101 by the centrifugally generated vacuum between the two].

In this example (Example 1), it will be found satisfactory to form separator 105 into an annulus about 0.048" high having an inner diameter of about 3 inches and an outer-diameter of about 4 inches (vs. floppy disk OD of 10 inches ID=3"). The separator height should not be reduced significantly below this 0.048"—e.g., at a height of 0.024" the pack was seen to "wobble" under rotation. Such a separator may, for convenience, be comprised of a stack of four 0.12' metal rings or a like thickness of plastic or other rings.

Effects:

The results of using such "tapered flexible multi-stack end plates" have been rather striking and quite surprising. For instance, as summarized in FIG. 10 at curve IV, when these are used with the "graduated-height" dummy spacers and other conditions specified, they facilitate a relatively uniform pneumatic partitioning of all the record gaps, #1 through #20, at rather moderate air flow (here prefer a cfm that yields 7 to 8 psi through the selected record-gap during partitioning); whereas dispensing with such novel end-plates makes it impossible to properly so-partition all 20 record-gaps. For instance, substituting the "single stack" flexible end-plates eP, eP' of FIG. 5B, leaves end-gaps #1 and #20 "unsplit" unless a much higher cfm is employed. Indeed, so replacing such "tapered flexible end-plates" with the "single stack" type mentioned, would not yield equivalent results—and not split gaps #1, #20 at the same low cfm—unless approximately 90 dummy disks and intermediate spacers are first added to each dummy pack (an enormous increase in cost and complexity, as workers will certainly appreciate!).

Moreover, as opposed to the mentioned rigid tapered end-plates of FIG. 5E, etc., such "flexible tapered end-plates" according to the invention allow adjacent "outer" dummy disks to reach an."equilibrium" position and shape naturally, and of their own accord at the indicated rpm, with an apparently smoother, more stable transition zone (between end-plate and dummy disks), while also affording good dynamic rigidity and shape. These tapered flexible end-plates were observed to be surprisingly rigid (about twice as rigid as the mentioned "single stack" type eP, eP', etc. of FIG. 5B) in operation; i.e., when properly rotated. Of course, in the "quiescent", unrotated condition, stacks 101, 103 simply "droop" down as does the single stack.

When properly spun up, the upper portion 101 of stiffener bep appears to fly quite satisfactorily flat and level, while the lower portion 103 appears to be "vacuum-sucked" up against the near side of plate 101 in a fashion of a "semi-rigid strut" or brace, under a cantilevered beam. It is not certain what supporting function is effected by plate 103 for plate 101; however, such a flexible "taper-plate" appears to afford a very desirable "pneumatic transition surface", in any case, between upper plate 101 and the adjacent dummy disks.

Results:

As further indicated below relative to FIGS. 5DD and 5DE, it is rather surprising that inner "taper-plate" 103 (of Ex. 1—the "plate" formed of stacked floppies) can, with sufficient rpm and resultant centrifugally-pumped air flow, be made to assume the indicated concave-taper, or rectilinear "strut" configuration suggested in FIG. 12. One might rather expect 103 to either collapse into a discontinuously curved "S-Bend" as in FIG. 5DD, or else, given sufficient rotational velocity, to stand out relatively "straight and level", as in FIG. 5DE (and in the manner of companion "plate" 101).

And, further, the flexible, dummy-confronting plate 103 seems to be able to accommodate the adjacent dummy disk in a desired separated, "pneumatic-standoff", condition; rather than it collapsing and being sucked-in against the adjacent stiffener surface, as in FIG. 5B, for instance.

In FIG. 5DD, stiffener bep of FIG. 12 is modified to comprise stiffener BB-ep, made-up of relatively the same sort of outer plate U and spacer means SP but with the inner "taper-plate" LL being understood as modified to be so thin (i.e., made of such a short stack of floppies) as to induce the indicated discontinous "S-Bend" curvature. This is quite undesirable, subjecting the disks to deleterious effects such as the compression and "clumping" of adjacent dummy disk dB-U and its neighbor dB-T.

The mentioned functions and characteristics of plates 101, 103, and separator 105 would be assumed as characteristic of any like arrangement having like associated dimensions and operating conditions (e.g., 3K rpm min. for a comparable mass) and will be assumed to require modification when the structure and/or operating conditions are changed.

The outer "flat" plate 101 will be understood as thick and heavy enough to fly substantially "flat" (and function as somewhat "rigid") at the indicated conditions (e.g., at least 3K rpm in Ex. 1), while the inner "taper plate" 103 will be less thick (that is not so thick as to fly flat and rigid and resist being vacuum-sucked up vs. 101 under the contemplated rpm and other affecting conditions). As indicated functionally and schematically in FIG. 5DE, a lower rpm, on the order of 1000, can make an identical plate 103 fly relatively "flat". Evidently, the higher rpm evacuates inter-plate gap s-g, sufficient to "suck" it up to touch the upper plate, at their tips, in the "taper" configuration of FIG. 12.

Yet, plate 103 should not be so "thin" (not such a short stack) as to be deformable and prone to collapse into an "S-Bend" as indicated in FIG. 5DD (where lower plate LL is depicted collapsed about the outer edge of the adjacent spacer SP, introducing a discontinuous S-Bend in its curvature—this having undesirable effects on adjacent disks). Thus, inner taper plate 103 must be just sufficiently thick to assume the intermediate "taper", or strut, configuration of FIG. 11, presenting a smooth, relatively continuous surface to the adjacent dummy disk—and little thicker.

Intermediate spacer 105 should be sufficiently high and wide to accommodate this relationship between outer and inner plates as in FIG. 12 as mentioned above.

Further Examples 2-6; see Table II:

Table II below summarizes some variations (Examples 2-6) in the thickness of outer and inner plates (101, 103) and expected effects thereof, as compared with Example #1). Otherwise, one may assume that the conditions, structures, etc. were the same as in Example 1 above.

TABLE II

|  | Thickness (mils) of: | | |
| --- | --- | --- | --- |
|  | 101 | 103 | Results? |
| Ex. #1 | 50 | 30 | V. Good, close to optimum |
| #2 | 65 | 35 | V. Good |
| #3 | 75 | 40 | V. Good |
| #4 | 60 | 20 | Fair-Good (some instability) |
| #5 | 30 | 20 | Poor |
| #6 | 30 | 30 | Unworkable (disks "wobble" badly) |
| [#7 | 150* | 150* | "workable] |

In Table II assume array as in FIG. 12; e.g., SP: .048" high and 3-4 inches in dia.; 3000 + RPM; with 10" disks, all stiffener disks being uncoated and 1 mil thick; as with dummies, and all improvements of FIGS. 5G;5F.

As may be gleaned from consideration of Examples 2-6, certain modifications of the "flexible, mutli-stack tapered stiffener" of Example 1 and FIG. 11 are feasible in certain instances, (assuming all other structures, operating conditions, etc. are kept the same). Thus, for this type arrangement, we find that outer plate 101 should be only sufficiently thick to impart the desired minimum rigidity and flatness, and little more—with 50-75 mils thickness typically preferred for an embodiment like Example 1. Workers will not want significantly more, since the added mass will simply be wasteful, requiring more rotating power, etc.

Related embodiments per Examples #2 and #3, suggest that this thickness can be increased to about 75 mils without degrading results. Significantly decreasing relative thickness, however, seems to leave plate 101 "wobbly" and too flexible (e.g., as in Examples #5, #6).

As mentioned, inner taper plate 103 should be at least relatively thick enough to avoid "collapse" of the plates together, with the associated deformation (S-Bend)

indicated in FIG. 5DD (here MIN of about 0.030" thickness for the Example #1 embodiment; evidently too thin in Example #4 at 0.020")—yet not be so thick as to render it "dynamically-stiff" (e.g., "straight-out", flat, level, somewhat-rigid condition as assumed by outer plate 101) at the indicated rpm, etc, as depicted schematically in FIG. 5DE. Related embodiments, Examples #2, #3 confirm that the height of inner plate 103 can be about 30 to 40 mils here. Example #4 confirms this (101 evidently thick enough here, so 103 must be too thin).

Example #7 was modified with 6 mil spacers, 15" disks and separator-wedge 105 about 90 mils thick.

Alternate embodiments:

While some described embodiments have involved a fixed memory unit (floppy disk pack) workers will understand that the instant invention may be used with a variety of such disk arrangements, such as removable floppy stack or one which is differently (e.g., non-pneumatically) partitioned.

Workers in the art will recognize many features of advantage and surprising novel utility deriving from device design and construction along the described lines. Such "variable flow" may be implemented in various ways, such as the preferred array of "different-height" dummy spacers described above.

Workers will perceive that using the novel stiffeners with such "gap-slaving" as aforetaught can better assure relief from deleterious symptoms of dummy-pack "instability".

It will be appreciated that novel flexible disk modules and related techniques as here described may be used with the indicated, and with other related, recording systems and be advantageously employed in various ways. Such arrangements will be seen as especially advantageous in conjunction with disks, spacers and disk packs like those described.

It will be understood that the preferred embodiments described herein are only exemplary and that they are susceptible of many modifications and variations in construction, arrangement and use, without departing from the spirit of the invention. For example, it has been assumed that an "end wise" separating air flow is necessary for operating the pack—however, while this is preferable, facilitating quick partitioning and a simplified transducer mount, other related means may be employed. In certain instances, with the disks somewhat split by a "separating air stream", separation can be completed with external supplementary means.

Further modifications of the invention are also possible. For example, the means and methods disclosed herein are also applicable with different related flexible disk means. Also the present invention is applicable for use with various other means for pneumatically partitioning a disk pack. They will recognize that using such designs, pack cost may be minimized—such floppy stack stiffeners being simple and inexpensive to manufacture and convenient to use.

Such stiffeners will be seen as designed and adapted for advantageous interaction with pneumatic disk separation means as described, wherein the natural centrifugal pumping action of the pack under high speed rotation assists in establishing a stable air film-separation of disks, while also assisting in pneumatic partitioning.

It will be surprising to workers how stable such a simple stiffener can be.

Now, the here-taught novel stiffeners are particularly apt for use with floppy pack units of the type described (e.g., "end wise" air separation), especially those including other optimizing features making "low cfm partitioning" practicable (e.g., as indicated in FIG. 10). Thus, for optimal results, we advise providing suitable "dummy packs" flanking a flexible record pack (e.g., suitably high and suitably pressurized to avoid "inspiratory" effects and keep the record-gaps uniform) while also "slaving" dummy gaps to certain respective record gaps, so as to increase the flow of partition air to the "outer" record-gaps which are "harder" to split. This is preferably done by varying the air flow to different dummy-gaps: more to those "slaved" to an "outer" record-gap; relatively less to those slaved to an "inner" record-gap, (i.e., in this "variable-flow" array of dummy-gaps, the "hardest" (to split) record-gaps are each slaved to a dummy-gap having minimum flow (Min. cfm), while the "easiest" are each slaved to dummy-gaps having Max. cfm).

Various other non-illustrated variants will be contemplated within the scope hereof. For instance, the two-pack stiffener may, in certain cases, be replaced with a "three-pack" or "four-pack" etc., variant with appropriate separator-wedges between the packs. Workers will envision other like variants.

The above examples of possible variations of the present invention are merely illustrative. Accordingly the present invention is to be considered as including all possible modifications and variations coming within the scope of the invention as defined by the appended claims.

What is claimed is:

1. In combination with a pack of flexible record disks, the disks being stacked in concentric array to be co-rotated at a prescribed rotational velocity, the improvement thereof comprising:
    a pair of floppy end-plates, each end-plate being disposed at a respective end of the pack and adapted to assume a semi-rigid "Delta" shape when co-rotated with the record stack at the said velocity;
    each end-plate being formed of at least two stacks of like contiguous flexible disks, the stacks being separated by wedge spacer means, with the thickness and mass of the "outer" stack being determined according to the stiffness desired; and with the thickness and mass of the "inner" stack(s) being selected to cause it to bend smoothly toward the "outer" stack when so co-rotated.

* * * * *

UNITED STATES PATENT AND TRADEMARK OFFICE
CERTIFICATE OF CORRECTION

PATENT NO. : 4,823,215

DATED : April 18, 1989

INVENTOR(S) : DEAN DE MOSS et al.

It is certified that error appears in the above-identified patent and that said Letters Patent is hereby corrected as shown below:

Col 15, line 24, after "lines." cancel lines 24 to 58, beginning: "Such 'variable "flow ... through: "Partitioning a disk pack."; then insert this entire section (ll. 24-58) at Col. 16, line 30, after: "gaps having Max. cfm)."

Signed and Sealed this

Twelfth Day of March, 1991

Attest:

HARRY F. MANBECK, JR.

*Attesting Officer*  *Commissioner of Patents and Trademarks*